(12) United States Patent
Tooman

(10) Patent No.: US 7,025,176 B1
(45) Date of Patent: Apr. 11, 2006

(54) BOLT GREASER UNIT

(76) Inventor: Norman L. Tooman, 2700 Larson La., Bakersfield, CA (US) 93304

( * ) Notice: Subject to any disclaimer, the term of this patent is extended or adjusted under 35 U.S.C. 154(b) by 491 days.

(21) Appl. No.: 10/456,170

(22) Filed: Jun. 9, 2003

(51) Int. Cl.
*F16N 7/00* (2006.01)

(52) U.S. Cl. ........................ 184/101; 411/428; 118/244

(58) Field of Classification Search ............ 184/18–20, 184/101, 102; 411/428; 118/244, 258, 263
See application file for complete search history.

(56) References Cited

U.S. PATENT DOCUMENTS

| | | | | |
|---|---|---|---|---|
| 3,814,525 A | * | 6/1974 | Spencer ...................... | 401/190 |
| 5,586,618 A | * | 12/1996 | Francis ........................ | 184/14 |
| 5,752,795 A | * | 5/1998 | D'Adamo .................... | 411/429 |
| 6,135,691 A | * | 10/2000 | Nadarajah et al. .......... | 411/431 |
| 6,729,819 B1 | * | 5/2004 | Wallace ....................... | 411/11 |
| 2003/0185642 A1 | * | 10/2003 | Imai et al. .................. | 411/14.5 |

FOREIGN PATENT DOCUMENTS

JP         2000288446 A   *   10/2000

\* cited by examiner

*Primary Examiner*—Chong H. Kim
(74) *Attorney, Agent, or Firm*—Charles C. Logan, II

(57) ABSTRACT

A bolt greaser unit for lubricating the exposed top ends of anchor bolts that secure the base tower of wind generators to the foundation that is formed in the ground. The bolt greaser unit has a vertically oriented tubular housing having a base member secured to its bottom end and a circular cap member detachably secured to its top end. The interior chamber of the tubular housing has a plurality of vertically oriented rod members having their bottom ends screwed into the top surface of the base member. Each rod member has a brush member telescopically received thereon. The top end of the rod members pass through apertures in the circular cap member and are secured in position by nuts. A universal joint structure is fixedly secured to the top surface of the cap member and it has a four sided shank portion extending upwardly that is telescopically received in the bore hole of a socket mounted on the drive shaft of a cordless power tool that would be used to rotate the bolt greaser unit. The base member has a central aperture having a width greater than the diameter of the anchor bolts over which the bolt greaser unit is lowered. A gob grease would be placed on the top end of the anchor bolts prior to insertion into the bottom end of the bolt greaser unit and when the drive shaft of the power tool rotates, the grease would be throughly spread into the grooves of the threads of the anchor bolts.

14 Claims, 3 Drawing Sheets

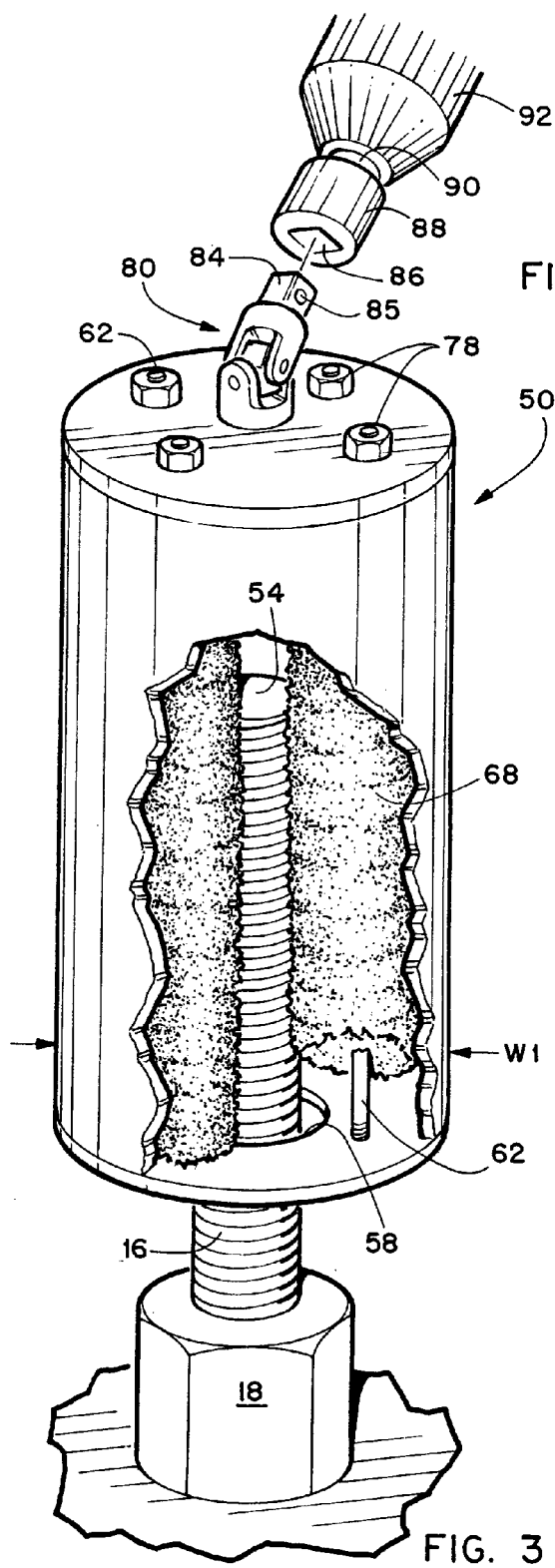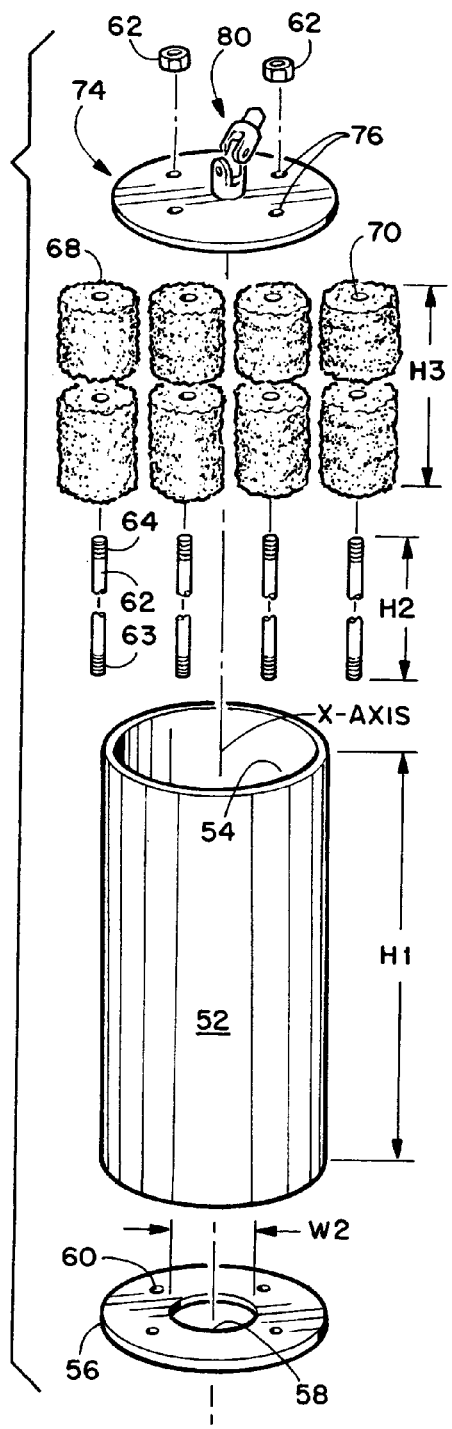

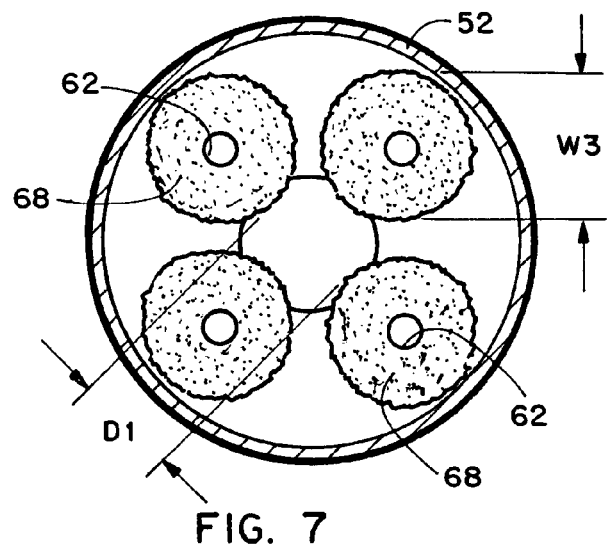
FIG. 7
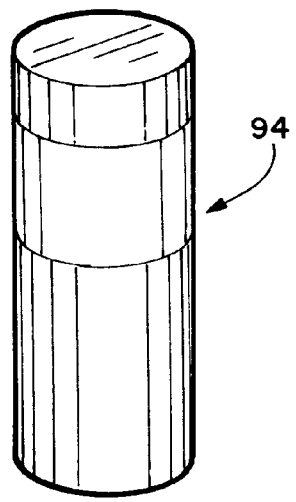
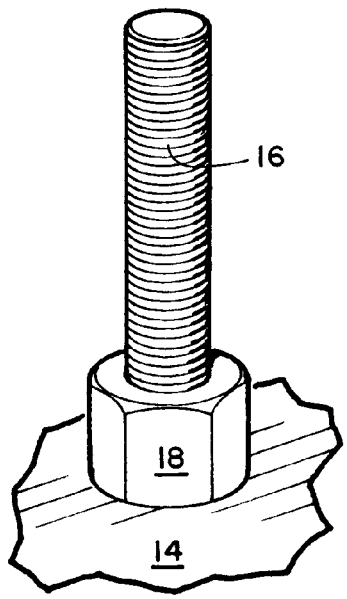
FIG. 5
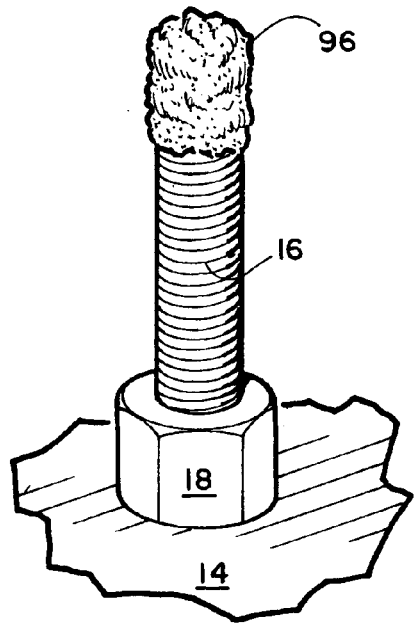
FIG. 6

BOLT GREASER UNIT

BACKGROUND OF THE INVENTION

The invention relates to wind generators having propellers or blades that are rotated by the force of the wind to produce electricity. More specifically, the invention relates to the exposed top ends of the anchor bolts that secure the tower base of the wind generator to the foundation that is formed in the ground. Prior to installing bolt caps over the exposed top ends of the anchor bolts, grease must be applied to the exposed external threads of the anchor bolts. The bolt greaser unit accomplishes this task both quickly and economically.

Presently there are numerous wind generators in existence that have a tower base 200 feet or higher. These wind generators have blades or propellers up to ninety feet or longer. There may be as many as 240 or more anchor bolts used to secure the tower base to the foundation. The foundation itself may be in the order of thirty feet deep and these anchor bolts may be in the order of thirty feet long. During the operation of anchoring the tower base to the foundation, a nut is tightened onto the top end of each of the anchor bolts. Next a second nut is threaded on to the top end of each of the anchor bolts. Then a hydraulic jack is used on each of the anchor bolts to stretch them by jacking them up with 70 to 80 thousand pounds of prestressed tension and the first nuts are lightly tightened down. When the hydraulic pressure on the jack is released the prestressed anchor bolts tighten the nuts down against the annular flanges on the bottom end of the tower base. The top ends of the anchor bolts are now exposed to the elements such as sun, wind, rain, snow and moisture. Over time the moisture seeps down into the concrete around the anchor bolts in the foundation. This causes corrosion that weakens the anchor bolts and shortens the life of the tower base. Presently the wind generators and tower bases are amortized over about twenty years. By preventing corrosion to the anchor bolts, the life of the wind generator and its tower base can be extended several years. This is quite significant when it is kept in mind that a wind generator can cost a million or more dollars.

It is an object of the invention to provide a novel bolt greaser unit that can quickly and thoroughly apply grease to the exposed top ends of the anchor bolts prior to installing an anchor bolt cap there over.

It is also an object of the invention to provide a novel bolt greaser unit that is economical to manufacture and market.

SUMMARY OF THE INVENTION

Wind generators generally cost over a million dollars to manufacture and install them on an operational site. The base tower of the wind generator is often in the range of 200 feet high and the blades almost 100 feet long. The bottom end of the tower base has to be secured to a substantial base foundation.

The base foundation is often in the order of thirty feet deep. The width of the base foundation is generally in the order of ten to fifteen feet in diameter. Approximately 250 anchor rods have their top ends extending upwardly from the top surface of the base foundation and they are spaced from each other in a circular pattern or a double circular pattern. These anchor rods have their bottom ends embedded in a tubular concrete structure that is formed on site.

The bottom end of the base tower has an outer annular flange and an inner annular flange and spaced apertures are formed in each of these around their periphery for mating with the respective top ends of the anchor bolts extending upwardly from the top surface of the base foundation. When the tower base is lowered on to the respective anchor bolts, they extend approximately 10 inches above the top surface of the annular flanges on the bottom end of the tower base. A nut is threaded on the top end of each of the respective anchor bolts and snugged down against the top surface of the respective annular flanges. The reason for having approximately ten inches of the anchor bolts exposed is because a second nut is then threaded on to the "top end" of the respective anchor bolts and a hydraulic jack is attached thereto for stretching and stressing the anchor bolts to approximately 70 to 80 thousand pounds of stress. Before removing the hydraulic jacks, the bottom nut is snugged against the top surface of the respective flanges.

The exposed outer surface of the top end of the anchor bolts then has a film of grease applied thereto that cuts off any oxygen contact with the threads of the anchor bolts. Presently this film of grease is applied manually which is a relatively slow process. When it is kept in mind that approximately 250 of these anchor rods need their top ends greased, the amount of time to accomplish this task is considerable. The bolt greaser unit can accomplish this task at a much faster pace and also in a much shorter accumulated time. A gob of grease is applied to the top end of the anchor bolts by lowering the open bottom end of a grease cartridge over the top of the anchor bolt until a gob of grease is applied thereto. Next the bolt greaser unit is lowered over the top end of the anchor bolt and the cordless power tool is actuated to quickly rotate the bolt greaser unit and spread the grease throughly into the exposed threads of the anchor bolt. This is accomplished in a matter of seconds and the worker can go from one anchor bolt to the next until he has completed the entire periphery of the tower base.

The bolt greaser unit has a cylindrical housing having a circular base member secured to its bottom end and a removable circular cap member. The circular base member has a central aperture whose width is greater than the diameter of any anchor bolt to be greased by the bolt greaser unit. The diameter of the central aperture would preferably be less than the diameter of the nuts that tighten down the anchor bolts so that the base member would rest on the upper surface of the nut. The top surface of the circular base member has threaded bore holes for receiving the threaded bottom ends of a plurality of rod members extending upwardly therefrom. Each rod member has a brush member having a bore hole that allows them to be telescopically slid over the top end of the rod members down into the chamber of the tubular housing. The top ends of the rod members are also externally threaded and these pass through apertures in the circular cap member. Nuts are fastened on the top ends of these rod members to hold the circular cap member in position. The width of the brush members and the spacing therebetween in the interior of the tubular housing is such that the top end of the anchor bolt would have its external threads pushed directly into contact with the surface of the brush members and the grease would also be throughly applied to the threads. The rotation of the bolt greaser unit quickly and throughly greases the top end of the exposed anchor bolts. Next the anchor bolt caps are slid over the top end of the anchor bolts. When properly aligned and centered, the bolt caps are easily pounded down on to the top of the nut and frictionally held in place. The width of the interior of the anchor bolt reception portion of the anchor bolt caps is only slightly larger than the diameter of the anchor bolt. This eliminates the possibility of the anchor bolt cap being rocked back and forth either by the stress produced upon it when the generator is operating or by individuals attempting to rock the anchor bolts caps off.

DESCRIPTION OF THE DRAWINGS

FIG. 3 is a front perspective view of the bolt greaser unit with portions broken away showing it lowered onto the top end of the anchor bolts;

FIG. 4 is an exploded front perspective view of the bolt greaser unit;

FIG. 5 is a front perspective view showing the grease cartridge prior to its being lowered onto the top end of an anchor bolt in order to apply a gob of grease thereto;

FIG. 6 is a front perspective view illustrating the anchor bolt having a gob of grease applied to its top end; and FIG. 7 is a schematic horizontal view illustrating the interior of the bolt greaser unit.

DESCRIPTION OF THE PREFERRED EMBODIMENT

Figure 1:
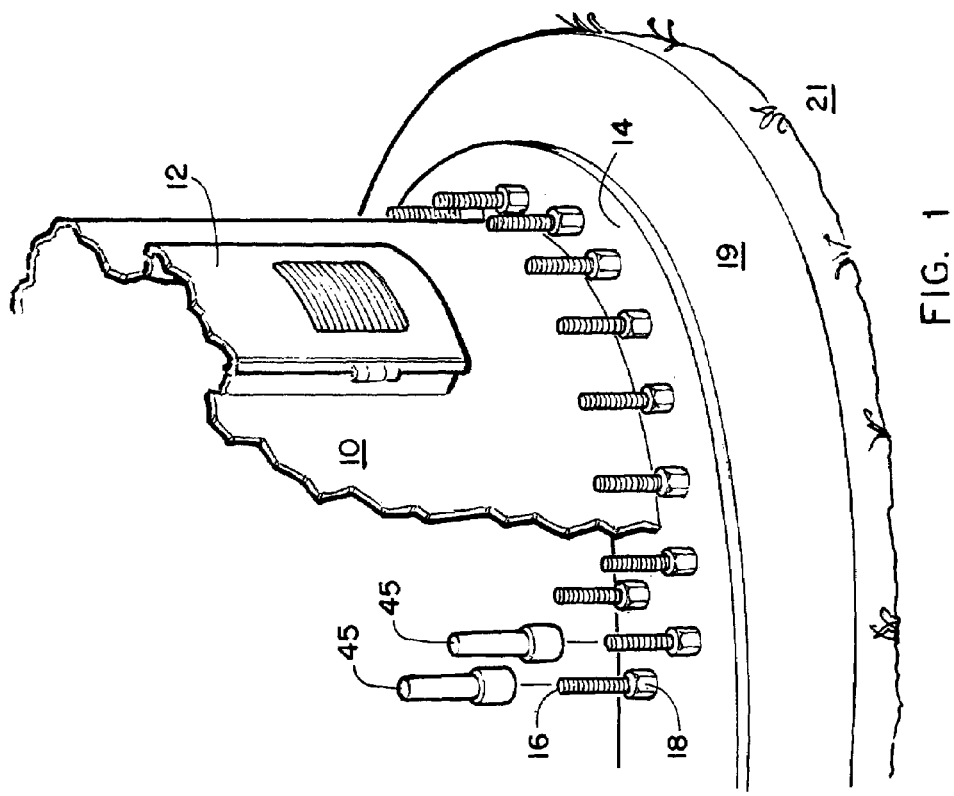
FIG. 1 is a partial front perspective view of the bottom of the tower base of a wind generator illustrating the manner in which it is secured to a concrete base foundation.

The invention will now be described by referring to FIGS. 1–2 of the drawings. FIG. 1 shows the bottom end of the tower base 10 of a wind generator. The tower base is normally 200 feet high and the wind generator has multiple blades (not shown) that are rotated by the wind. A door 12 gives access to the interior of the tower base. An outer annular flange 14 is formed on the bottom end of tower base 10 and a similar inner annular flange (not shown) would be on the interior of the tower base 10. The top ends of anchor bolts 16 extend at least 10 inches above the top surface of flange 14 and each has a nut 18 threaded thereon. A concrete walk 19 extends around the perimeter of tower base 10. The base foundation 20 is not seen and it is covered by dirt 21.

Figure 2:
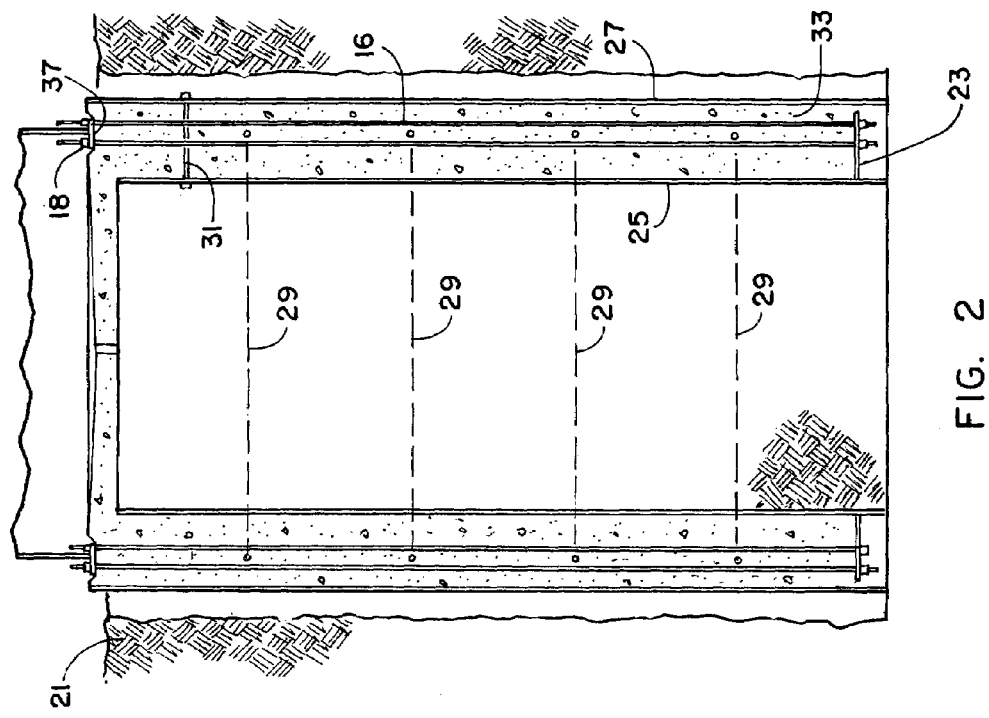
FIG. 2 is a schematic vertical cross section illustrating the construction of the base foundation for the wind generator.

FIG. 2 is a schematic side elevation view of base foundation 20. It is formed on site in a hole approximately 30 feet deep and about 10–15 feet in diameter. A metal embedment ring 23 is placed in the base foundation hole spaced a predetermined distance above the bottom of the hole. Approximately 250 anchor bolts 16 have their bottom ends captured in apertures in the embedment ring and have a nut threaded on to their bottom end. The anchor bolts are oriented in two concentric circular patterns. Each of the anchor bolts 16 has a tubular conduit slid over them to protect them from concrete that is later poured between cylindrical inner metal form 25 and cylindrical outer metal form 27. Horizontally spaced re-bar hoops 29 maintain the anchor bolts in their proper alignment. Spacer rods 31 are located at various positions to keep the respective inner and outer metal forms 25 and 27 in their proper positions. Outer metal form 27 is longer than inner metal form 25 so that when concrete 33 is poured between the respective forms, it will travel downwardly and centrally to form a concrete bottom wall. Dirt is filled into the area within the center of metal form 25. A metal template ring 37 has an outer and inner circular pattern of apertures for receiving the top ends of the respective anchor bolt 16. The top surface of metal template ring 37 forms an annular trough that is later filled with grout. When the grout has properly set, the bottom end of tower base 10 is erected on the top surface of metal template ring 37 with respective top ends of the anchor bolts 14 passing through the respective apertures in the inner flange (not shown) and outer flange 14 in the manner illustrated in FIG. 1.

The next step involves screwing nuts on the top end of anchor bolt 16 following which a second nut is then threaded on to "the top end" of the respective anchor bolts and hydraulic jacks are attached thereto so that the anchor bolts can be stressed to approximately 70 to 80 thousand pounds of stress. At this time the lower nuts are cinched down and the hydraulic jacks and their associated nuts are removed. The exposed threads of the anchor bolts 16 are then covered with a film of grease to keep them protected from attack by the oxygen in the air. This is accomplished by using the bolt greaser unit 50. Anchor caps 45 are then installed over the top end of the anchor bolts 16 and with a few strokes of a hammer are frictionally locked in place.

The bolt greaser unit 50 has a cylindrical tubular housing 52 that is preferably made of metal material. It has a height H1 and H1 is in the range of 1.5–10 inches. Tubular housing 52 has an interior chamber 54. Tubular housing 52 has width W1 and W1 is in the range of 2–5 inches. Tubular housing 52 has a vertically oriented X-axis. A circular base member 56 is secured to the bottom end of tubular housing by using an adhesive, by welding or any other suitable means. Circular base member 56 has a central aperture 58 having a width W2 that is greater than the diameter of any bolt 16 to be greased by the bolt greaser unit 50. W2 is in the range of 1.0–2.0 inches. The top surface of circular base member 56 has a plurality of threaded bore holes 60.

A plurality of upright oriented rod members 62 have external threads 63 on their bottom ends and external threads 64 on their top ends. The bottom ends of rod member 62 are screwed into the threaded bore holes 60. Rod members 62 have a height H2 and H2 is in the range of 2.0–9.5 inches. A plurality of elongated brush members 68, similar to paint rollers, have a bore hole 70 extending from their top end to their bottom end and these brush members are telescopically received on the respective rod members 62. Brush members 68 have a height H3 and H3 is slightly less than the length of H2. FIG. 7 is a schematic illustration showing the brush members positioned in the interior of tubular housing 52. The brush members have a width W3 and W3 is in the range of 1–3 inches. The inner surface of brush members 68 are spaced from each other a distance D1 and D1 is in the range of 0.05–0.75 inches. Cap member 74 has a plurality of apertures 76 through which the top ends of rod members 62 extend. Nuts 78 secure cap member 74 to the top end of tubular housing 52. A universal joint structure 80 is rigidly secured to the top surface of cap member 74. It has a square shank portion 84 having a spring loaded ball 85 therein. Shank portion 84 is removably received in the bore hole 86 of socket 88 that is mounted on the drive shaft 90 of a cordless drill 92.

FIG. 5 shows a grease cartridge 94 having its exposed bottom end about to lowered about an inch on to the top end of an anchor bolt 16. FIG. 6 shows a gob grease 96 deposited onto the top end of anchor bolt 16. At this time bolt greaser unit 50 would be lowered down onto the top end of anchor bolt 16 and power tool 72 actuated to cause the bolt greaser unit to spin at a predetermined rate. This allows the gob of grease to be throughly applied to the external threads of anchor bolt 16.

What is claimed:

1. A bolt greaser unit comprising:
   a vertically oriented tubular housing having a top end, a bottom end, an interior chamber, a first height (H1), a first width (W1) and a longitudinally extending axis;

a base member having a top surface is rigidly connected to said tubular housing adjacent said bottom end of said tubular housing, said base member having an aperture having a predetermined second width (W2) that is greater than the diameter of any bolt to be greased by said bolt greaser unit;

a plurality of laterally spaced vertically oriented rod members each having a top end, a bottom end, and a second height (H2); said bottom ends of said rod members being connected to said base member;

a plurality of vertically oriented brush members each having a bore hole extending their entire height; said brush members being telescopically installed over said rod members; said brush members having a third width (W3); said brush members being laterally spaced from each other a predetermined distance (D1) that is less than the diameter of any bolt to be greased by said bolt greaser unit;

a cap member having a top surface and a bottom surface, said bottom surface being positioned adjacent said top end of said tubular member to close said interior chamber;

attachment means for securing said top ends of said rod members to said cap member; and rotation means rigidly mounted on said top surface of said cap member for detachable connection to a power tool that rotates said vertically oriented tubular housing about said axis.

2. A bolt greaser unit as recited in claim 1 wherein said tubular housing has a cylindrical shape.

3. A bolt greaser unit as recited in claim 1 wherein said first height is in the range of 1.5–10 inches.

4. A bolt greaser unit as recited in claim 3 wherein said first width is in the range of 2–5 inches.

5. A bolt greaser unit as recited in claim 1 wherein said second width is in the range of 0.70–2.0 inches.

6. A bolt greaser unit as recited in claim 5 wherein said aperture in said base member is circular.

7. A bolt greaser unit as recited in claim 1 wherein said second height is in the range of 2.0–9.5 inches.

8. A bolt greaser unit as recited in claim 1 wherein said third width is in the range of 1–3 inches.

9. A bolt greaser unit as recited in claim 1 wherein said distance is in the range of 0.05–0.75 inches.

10. A bolt greaser unit as recited in claim 1 wherein there are four rod members and four brush members.

11. A bolt greaser unit as recited in claim 1 wherein said attachment means comprises apertures in said cap member through which said top ends of said rod members extend; said top end of said rod members being externally threaded; and nuts are threaded on to said top ends of said rod members.

12. A bolt greaser unit as recited in claim 11 wherein said bottom ends of said rod members are externally threaded and said bottom ends of said rod members are received in threaded bore holes in said top surface of said base member.

13. A bolt greaser unit as recited in claim 1 wherein said rotation means comprises an upwardly extending four sided shank portion that would be telescopically received in a four sided bore hole of a socket mounted on the drive shaft of a cordless power tool.

14. A bolt greaser unit as recited in claim 13 wherein said rotation means further comprises a universal joint structure connected to said four sided shank portion.

* * * * *